E. N. ROTH.
HOSE COUPLING GASKET.
APPLICATION FILED MAR. 18, 1919.

1,393,316.

Patented Oct. 11, 1921.
2 SHEETS—SHEET 1.

E. N. ROTH.
HOSE COUPLING GASKET.
APPLICATION FILED MAR. 18, 1919.

1,393,316.

Patented Oct. 11, 1921.

UNITED STATES PATENT OFFICE.

EDWARD N. ROTH, OF CHICAGO, ILLINOIS, ASSIGNOR TO ROTH MANUFACTURING COMPANY, OF CHICAGO, ILLINOIS, A CORPORATION OF ILLINOIS.

HOSE-COUPLING GASKET.

1,393,316.     Specification of Letters Patent.    Patented Oct. 11, 1921.

Application filed March 18, 1919. Serial No. 283,291.

*To all whom it may concern:*

Be it known that I, EDWARD N. ROTH, a citizen of the United States, residing at Chicago, in the county of Cook and State of Illinois, have invented certain new and useful Improvements in Hose-Coupling Gaskets, of which the following is a specification.

My invention relates to an improvement in couplings, more particularly in hose couplings suitable for connecting steam train pipes on railway cars, of the type comprising mating coupler members having gaskets and provided with means whereby the gasket of one member can be pressed by cam or wedging action against the gasket of the other member with considerable force, when the members are brought into coupled relation, in order to insure a fluid tight joint. It has been customary in steam train line hose couplings, to use gaskets of rubber composition but the life of such gaskets is short, especially in a coupler of the type referred to, because of the severe crushing pressure which the gaskets receive when one coupler is locked to or forced against the other. It is one of the objects of the invention to provide a gasket suitable for a coupler of this type which will be more durable than the usual rubber composition or Jenkins material gasket now employed almost universally in couplers of this sort, and which will be of a character to insure a steam tight joint with the gasket of the mating coupler member.

A railway train pipe hose coupling is subject to considerable vibration and disturbance due to its suspended position between the cars, and where the coupler consists of two or more parts the maintenance of a steam-tight joint depends upon keeping these parts in their wedging relation. There is some danger that vibration or other disturbing forces may produce a loosening of these parts which will allow the coupler to leak or even become disconnected from its mating coupler member. It is one of the objects of this invention to provide a resilient gasket for a coupler of this character which will exert sufficient pressure between the parts in wedging engagement to prevent any such loosening movements thereof.

The invention is illustrated, in certain preferred embodiments, in the accompanying drawings wherein—

Figure 1:
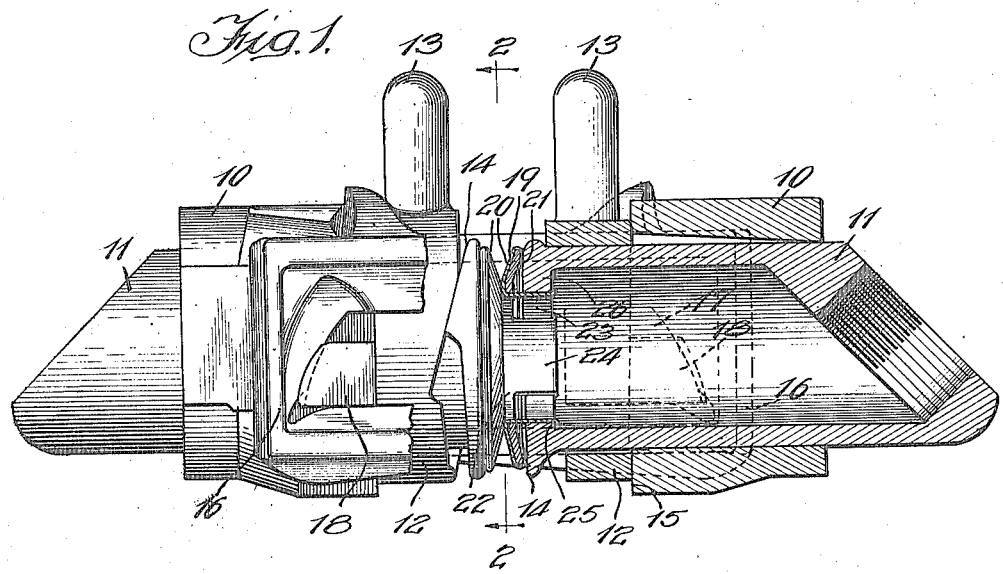
Figure 1 is a side elevation of a pair of couplers each provided with a gasket constructed in accordance with my invention, one of the coupler members being shown in section.
Figure 2:
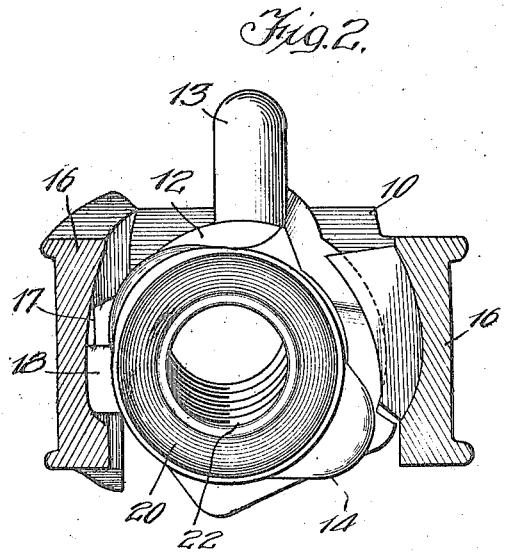
Fig. 2 is a sectional view on line 2—2 of Fig. 1.
Figure 3:
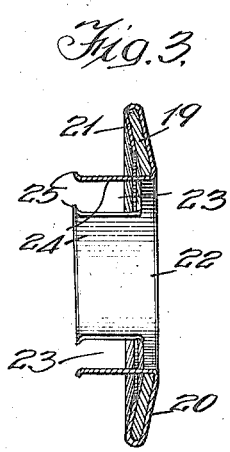
Fig. 3 is a cross sectional view of the gasket.
Figure 4:
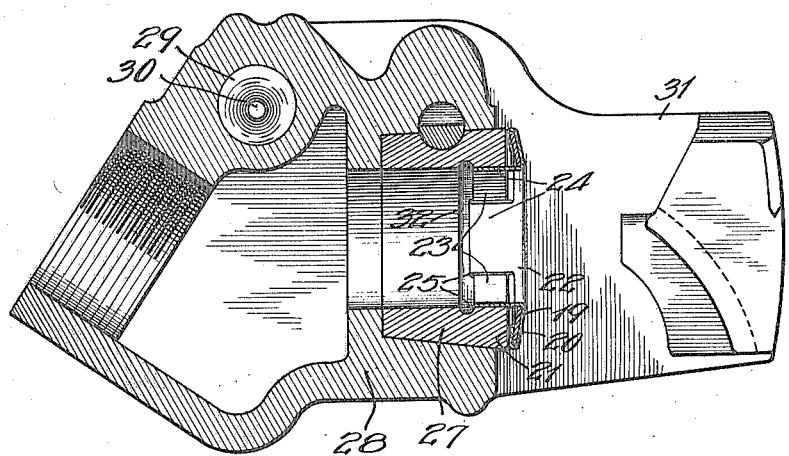
Figure 5:
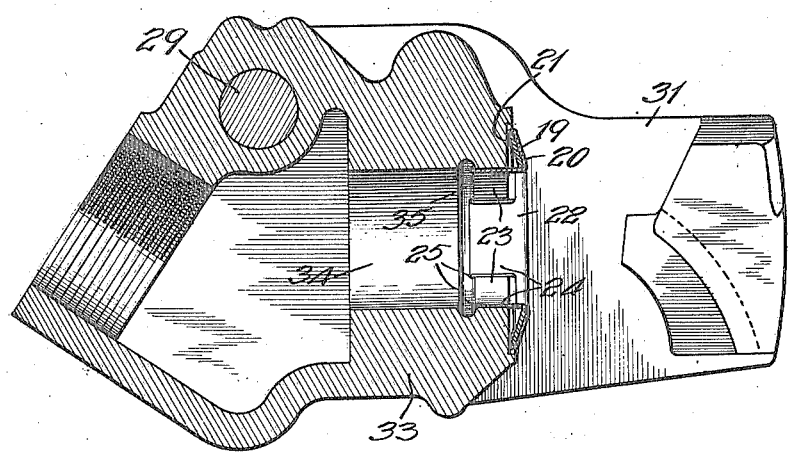

Fig. 4 is a longitudinal sectional view of a coupler of a somewhat different type from that illustrated in Figs. 1 and 2, the gasket being applied to the rubber composition gasket with which couplers of this type are ordinarily provided, and Fig. 5 is a view similar to Fig. 4 illustrating a modification of the coupler, which, generally speaking, is like that shown in Fig. 4, except that it permits the resilient metal gasket to be applied directly to the coupler head instead of the rubber composition gasket.

Like characters of reference designate like parts in the several figures of the drawings.

The coupler shown in Figs. 1 and 2 is composed essentially of three parts, a head or coupling member 10, a conduit or gasket holding member 11, and a wedging or cam ring member 12 which has a handle 13 and is interposed between a projection 14 on the conduit member, and a shoulder 15 on the coupling member whereby a rotational movement of this cam ring will force the conduit member toward the mating coupler. The coupling member 10 is provided with an arm 16 having an aperture 17 for engagement with a locking lug 18 on the face of the mating coupler head. The coupler, as described to this point, is not my invention and no claim to the same is made herein.

In a coupler of this type it is necessary, in order that a steam tight joint should be maintained, with the mating coupler (whether the mating coupler be of the same or of different construction), that the frictional engagement between the cam ring and the other parts of the coupler should be sufficient to resist the tendency, due to vibration or other disturbing influences, of the cam ring to turn in the backward direction, that is, in the direction opposite to that in which the ring is rotated to force the conduit member against the mating coupler. Moreover, if an ordinary gasket made of rubber composition, or Jenkins material as it is sometimes called, is used in a coupler of this type, that is, in a coupler in which the gasket may be pressed with very considerable force against the mating coupler, such gasket is liable to be mutilated or crushed. My invention provides a gasket suitable for use in this situation which is resilient, being made of metal, so that it will yield or be compressed under the force exerted by the cam ring and when so compressed will exert a stress against the co-engaging parts of the coupler tending to increase the frictional engagement of those parts with each other, thereby preventing backward movement of the cam ring; and which will yield so as to pack against and make a snug fit with the gasket of the mating coupler and yet will be strong enough so as not to be injured by the wedging pressure exerted by the cam ring or other element employed for moving the conduit member relative to the coupler member.

This gasket can be made in various ways. Preferably it consists of a steel ring 19 which is formed so that it stands oblique to the longitudinal axis of the gasket, and a soft metal facing element 20, one edge, 21, of which is lapped around the outer edge of the ring, the other edge of which being in the form of an annular flange 22 projecting from the inner edge of the ring 19 and preferably formed with openings 23 dividing the flange into lips or fingers 24, the ends of which are preferably slightly outturned as indicated at 25 to engage with the inner edge of a shoulder 26 formed at the outer end of the conduit member 11. This sheet copper or brass is a suitable metal for element 20 of the gasket.

When the gasket is constructed as shown it may be readily engaged with the conduit member since the lips or fingers 24 are, to a certain extent, resilient and can be as easily removed from the conduit member when desired. The ring 19 will flex under the pressure created by the cam ring so as to make a steam tight joint with the gasket of the mating coupler. The spring provided by the ring 19 constitutes a spring of considerable stiffness so that when compressed it exerts a very considerable pressure against the parts of the coupler which will tend to prevent the same from becoming loosened.

In Fig. 4 I have shown a gasket such as is shown in the preceding figures as applied to the ordinary rubber composition gasket 27 of a coupler 28 of the "Chicago" type. The "Chicago" coupler is a gravity or Sewall type coupler provided with a rotatable locking bolt 29 having an eccentric conical end, indicated at 30, which is turned to exert a downward force against the locking arm of the mating coupler head, the arm corresponding to arm 31 shown in Fig. 4. This type of coupler is in common use and is described and claimed in United States patent to T. H. Manchester, No. 1,019,979, patented March 12, 1912. The locking device operates not only to hold the coupler in positive engagement with the mating coupler member but to force the gasket of one coupler against that of the other. This insures a tight fit between the gaskets but as the trainman is likely to drive the locking bolt too hard, often using a hammer, there is danger that the gasket may be injured by excessive pressure against it. The metal gasket element of my present invention, when fastened to the rubber composition gasket, the fingers 24 of the former in such case engaging a groove 32 formed on the interior surface of the latter, serves to save the rubber composition gasket from the destructive effects of uneven pressure.

In Fig. 5 I have shown the metal gasket applied directly to a coupler 33 which is of the "Chicago" type but is modified so that the rubber composition gasket may be omitted and the resilient metal gasket engaged directly with the coupler head. The steam port 34, instead of being recessed for the ordinary gasket, is of uniform diameter throughout its length except that it is formed with a circumferential groove 35 to receive the extremities of the fingers 24 of the gasket.

I claim:

1. The combination with a coupler comprising a head adapted to engage with a mating coupling member, a gasket holding member and means for forcing said gasket holding member against the mating coupling member; of a gasket associated with said gasket holding member comprising a resilient metal element which is stressed when said coupler is engaged with the mating coupler member.

2. The combination with a coupler comprising a head adapted to engage with a mating coupling member, a gasket holding member, and means for forcing said gasket holding member against the mating coupling member; of a gasket associated with said gasket holding member comprising a resilient metal ring which is oblique, in the direction of its width, to the longitudinal axis of the gasket and is adapted to bear upon and be compressed against said mating coupling member.

3. A hose coupling gasket comprising a resilient metal ring which is oblique, in the direction of its width, to the longitudinal axis of the gasket, and a soft metal facing on the ring provided with means for engaging the gasket with the coupler.

4. A hose coupler gasket comprising a resilient metal ring, and a metal facing on the ring having an inwardly extending flange to provide means for engaging the gasket with the coupler.

5. A hose coupler gasket comprising a resilient ring and a thin piece of metal covering the ring and projecting from the inner edge of the same to provide means for engaging the interior wall of the port of the coupler.

6. A hose coupler gasket comprising a resilient metal ring which is oblique, in the direction of its width, to the longitudinal axis of the gasket, and a soft metal facing lapped around the outer edge of the ring and projecting from the inner edge of the same to provide means for engaging the gasket with the coupler.

7. A hose coupler gasket comprising a steel ring which is oblique, in the direction of its width, to the longitudinal axis of the gasket, and a soft metal facing lapped around the outer edge of the ring and projecting from the inner edge of the same and cut away at intervals to provide resilient fingers for engaging the gasket to the coupler.

8. A hose coupling gasket comprising a resilient flat metal ring, both faces of which are conical, and a soft metal facing on the ring.

EDWARD N. ROTH.